(12) United States Patent
Lange et al.

(10) Patent No.: US 6,944,404 B2
(45) Date of Patent: Sep. 13, 2005

(54) NETWORK TRANSCEIVER FOR EXTENDING THE BANDWIDTH OF OPTICAL FIBER-BASED NETWORK INFRASTRUCTURE

(75) Inventors: Michael Lange, Palm Bay, FL (US); John DeSalvo, Satellite Beach, FL (US); Edward Tegge, Palm Bay, FL (US); John Dodzweit, Satellite Beach, FL (US)

(73) Assignee: Harris Corporation, Melbourne, FL (US)

(*) Notice: Subject to any disclaimer, the term of this patent is extended or adjusted under 35 U.S.C. 154(b) by 641 days.

(21) Appl. No.: 09/812,236

(22) Filed: Mar. 19, 2001

(65) Prior Publication Data

US 2002/0071159 A1 Jun. 13, 2002

Related U.S. Application Data (60) Provisional application No. 60/254,724, filed on Dec. 11, 2000.

(51) Int. Cl.[7] .......................... H04J 14/02; H04B 10/00
(52) U.S. Cl. ......................... 398/138; 398/79; 398/135; 398/139
(58) Field of Search ........................... 398/79, 82, 135, 398/139, 138

(56) References Cited

U.S. PATENT DOCUMENTS

| | | | | |
|---|---|---|---|---|
| 4,415,803 A | * | 11/1983 | Muoi ..................... 250/214 A |
| 4,930,855 A | * | 6/1990 | Clark et al. .................... 398/79 |
| 4,932,004 A | * | 6/1990 | Hodara et al. ................. 367/76 |
| 4,947,458 A | | 8/1990 | Mito .......................... 455/609 |
| 5,138,675 A | | 8/1992 | Schofield ..................... 385/28 |
| 5,140,451 A | | 8/1992 | Talat et al. ................... 359/114 |
| 5,245,404 A | | 9/1993 | Jannson et al. .............. 356/301 |
| 5,278,687 A | | 1/1994 | Jannson et al. .............. 359/125 |
| 5,778,127 A | | 7/1998 | Gilliland et al. .............. 385/92 |
| 5,790,289 A | * | 8/1998 | Taga et al. ..................... 398/79 |
| 5,825,949 A | * | 10/1998 | Choy et al. .................... 385/24 |
| 5,915,054 A | | 6/1999 | Ota .............................. 385/46 |
| 5,953,690 A | | 9/1999 | Lemon et al. ............... 702/191 |
| 6,014,237 A | | 1/2000 | Abeles et al. ................ 359/124 |
| 6,141,126 A | | 10/2000 | Lahat et al. ................. 359/121 |
| 6,151,144 A | * | 11/2000 | Knox ........................... 398/79 |
| 6,154,774 A | | 11/2000 | Furlong et al. .............. 709/224 |
| 6,404,522 B1 | * | 6/2002 | Handelman ................... 398/79 |
| 6,496,261 B1 | * | 12/2002 | Wilsher et al. .............. 356/450 |
| 6,512,614 B1 | * | 1/2003 | Saleh et al. .................... 398/47 |
| 6,577,605 B1 | * | 6/2003 | Dagate et al. ............... 370/270 |
| 6,607,311 B1 | * | 8/2003 | Fishman et al. .............. 398/79 |
| 6,690,668 B1 | * | 2/2004 | Szczepanek et al. ......... 370/392 |
| 2002/0077995 A1 | * | 6/2002 | Allison et al. .................. 707/1 |

FOREIGN PATENT DOCUMENTS

| | | | |
|---|---|---|---|
| EP | 0 667 690 | 8/1995 | ........... H04J/14/02 |
| EP | 1 043 847 | 10/2000 | ........... H04B/10/12 |
| WO | 00/64087 | 10/2000 | ........... H04J/14/02 |

OTHER PUBLICATIONS

Hiroshi, Yasaka, et al., "Optical Frequency Spacing Tunable Four–Channel Integrated 1.55 μm Multielectrode Distributed–Feedback Laser Array," IEEE Photonics Technology Letters, vol. 1, No. 4, Apr. 1, 1989, pp. 75–76.

Lentke, Hermann, "Optischer Wellenlangenmultiplex fur Lokale Netze," VDE Verlag GMBH, vol. 47, No. 1, 1994, pp. 26–28. (no English translation available).

* cited by examiner

*Primary Examiner*—M. R. Sedighian
(74) *Attorney, Agent, or Firm*—Allen, Dyer, Doppelt, Milbrath & Gilchrist, P.A.

(57) ABSTRACT

A multimode wavelength division multiplexing (WDM) network transceiver and method includes a plurality of optical transmitters and a multiplexer operatively connected to each optical transmitter for receiving optical communications signals and multiplexing the signals into a multimode wavelength division multiplexed optical communications signal. A demultiplexer receives a multimode wavelength division multiplexed optical communications signal and demultiplexes the signal into a plurality of demultiplexed optical communications signals that are then received and detected within a plurality of optical receivers.

14 Claims, 10 Drawing Sheets

NETWORK TRANSCEIVER FOR EXTENDING THE BANDWIDTH OF OPTICAL FIBER-BASED NETWORK INFRASTRUCTURE

RELATED APPLICATION

This application is based upon prior filed provisional application Ser. No. 60/254,724 filed Dec. 11, 2000.

FIELD OF THE INVENTION

This invention relates to time division multiplexing networks, such as an Ethernet infrastructure, and more particularly, this invention relates to expanding the bandwidth of an optical fiber-based time division multiplexed network infrastructure.

BACKGROUND OF THE INVENTION

Time division multiplexing networks, such as an Ethernet infrastructure, are increasingly becoming important in the technology of today. The bandwidth used on such networks require periodic increases as more users are added, larger files are transferred, and more complicated programs run on servers and workstations. The infrastructures vary on design, and include 10 Mb/S (10 Base-T), 100 Mb/S (100 Base-T), and 1,250 Mb/S (1,000 Base-T). Typically, to increase an Ethernet bandwidth, the data rate was increased, such as operating from an original 10 Base-T system to a 100 Base-T system.

It has been found that increasing the data rate transmission in multimode fiber is severely limited by modal dispersion. One method currently used for combatting the modal dispersion degradation is to use newly developed multimode fiber designs, such as InfiCore, which requires replacing existing fiber infrastructures. This can be expensive, especially in some metropolitan areas where it is cost prohibitive to add additional or replace optical fiber lines. For example, in a major metropolitan area, to replace or add fiber lines would require obtaining many permits from municipal authorities and many worker hours in replacing or adding additional cables under existing streets. Also, prior art wavelength channels in some multiplex schemes have been wide, at about 3,000 gigahertz.

SUMMARY OF THE INVENTION

It is therefore an object of the present invention to expand the bandwidth of an existing optical communications network without the drawbacks of the prior art.

The present invention is advantageous and builds on existing network, e.g., Ethernet components, and existing fiber infrastructure. The system technical approach is extensible to higher channel counts and higher data rates to achieve higher aggregate information capacity.

In one aspect of the present invention, a multimode wavelength division mutliplexing (WDM) network transceiver includes a plurality of optical transmitters for transmitting optical communications signals along respective signal paths. A multiplexer is operatively connected to each optical transmitter and receives the optical communications signals and multiplexes the optical communications signals into multimode wavelength division multiplexed optical communications signal having wavelength channel spacings less than about 1,000 gigahertz. A demultiplexer receives a multimode wavelength division multiplexed optical communications signal and demultiplexes the signal into a plurality of demultiplexed optical communications signals. A plurality of optical receivers are each matched with a respective optical transmitter and receives and detects a respective demultiplexed optical communications signal.

In one aspect of the present invention, the optical receiver comprises a PIN Detector. The PIN detector comprises an InGaAS PIN detector. It also includes a transimpedance amplifier. In yet another aspect of the present invention, the transmitter comprises a distributed feedback laser and a thermoelectric cooler and controller circuit.

In still another aspect of the present invention, an attenuator is positioned within a signal channel between each optical transmitter and the multiplexer. A single mode optical fiber defines a signal channel between the attenuator and the optical transmitter, and a multimode optical fiber defines a signal channel between the attenuator and multiplexer. A transceiver is electrically connected to each optical transmitter and matched optical receiver for receiving and transmitting an optical communications signal. The transceiver is operative at a first wavelength band and the optical transmitter and matched optical receiver are operative at a second wavelength band, which is upconverted from the first wavelength band.

In yet another aspect of the present invention, the network transceiver includes physical sublayer chip circuits operatively connected to a plurality of optical transmitters and matched optical receivers. An electrical interface is operatively connected to the physical sublayer chip circuit. The electrical interface comprises a plurality of RJ-45 jacks Ethernet 1,000 Base-T connection. A serial/deserializer (SERDES) circuit is operatively connected to an optical transmitter and matched optical receiver. A switch circuit is operatively connected to the serial/deserializer circuit and a physical sublayer chip circuit and electrical interface are operatively connected to the switch circuit.

In one embodiment of the present invention, a multiport network hub includes a plurality of transceiver boards, each having a network interface connection to a network and a switch circuit operatively connected to the network interface. At least one optical transmitter receives signals from the network on the network interface and transmits optical communications signals. At least one optical receiver is matched with the at least one optical transmitter for receiving and detecting an optical communications signal and generating a signal to the network via the network interface. A processor is operatively connected to the switch circuit for controlling same. A bus interconnects each processor and a wavelength division multiplexer is operatively connected to each optical transmitter for multiplexing the optical communications signals into a multimode wavelength division multiplexed optical communications signal. A demultiplexer is operatively connected to each optical receiver and receives and demultiplexes multimode wavelength division multiplexed optical communications signal into a plurality of demultiplexed optical communications signals.

A method is also disclosed of expanding the bandwidth of an existing optical communications network by transmitting optical communications signals from a plurality of optical transmitters positioned along respective signal channels. The optical communications signals are multiplexed into a multimode wavelength division multiplexed optical communications signal. A demultiplexer demultiplexes a multimode wavelength division multiplexed optical communications signal into a plurality of optical communications signals along respective signal channels that are receiving detected signals with optical receivers that are matched with the optical transmitters.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

An apparatus and method of the present invention includes a multimode wavelength division multiplexing (WDM) network transceiver that allows the bandwidth extension of an optical fiber-based wavelength division multiplexed network infrastructure, such as an Ethernet infrastructure as a non-limiting example, using multimode wavelength division multiplexer technology. Throughout this description, the apparatus and method of the present invention is described relative to an Ethernet infrastructure. The invention, however, can be applied to any network infrastructure having time division multiplexed transparent capabilities. Ethernet is only one type of format that can be used in the present invention.

As noted before, prior art practices increase the Ethernet bandwidth by increasing the data rate of signals within the infrastructure, such as 10 Mb/S (10 base-T), 100 Mb/S (100 base-T), and 1,250 Mb/S (1000 base-T). Increasing the data rate transmission in multimode fiber is limited, however, by modal dispersion. Placing additional lines in some areas is cost prohibitive. For example, it is cost prohibitive to add additional optical fiber lines under a street in a crowded metropolitan area. The present invention advantageously increases the network bandwidth, e.g., Ethernet bandwidth, using multimode fiber-based wavelength division multiplexing techniques by building on the existing network components and existing fiber infrastructures. It is extensible to higher channel counts and higher data rates to achieve higher aggregate information capacity.

Figure 1:
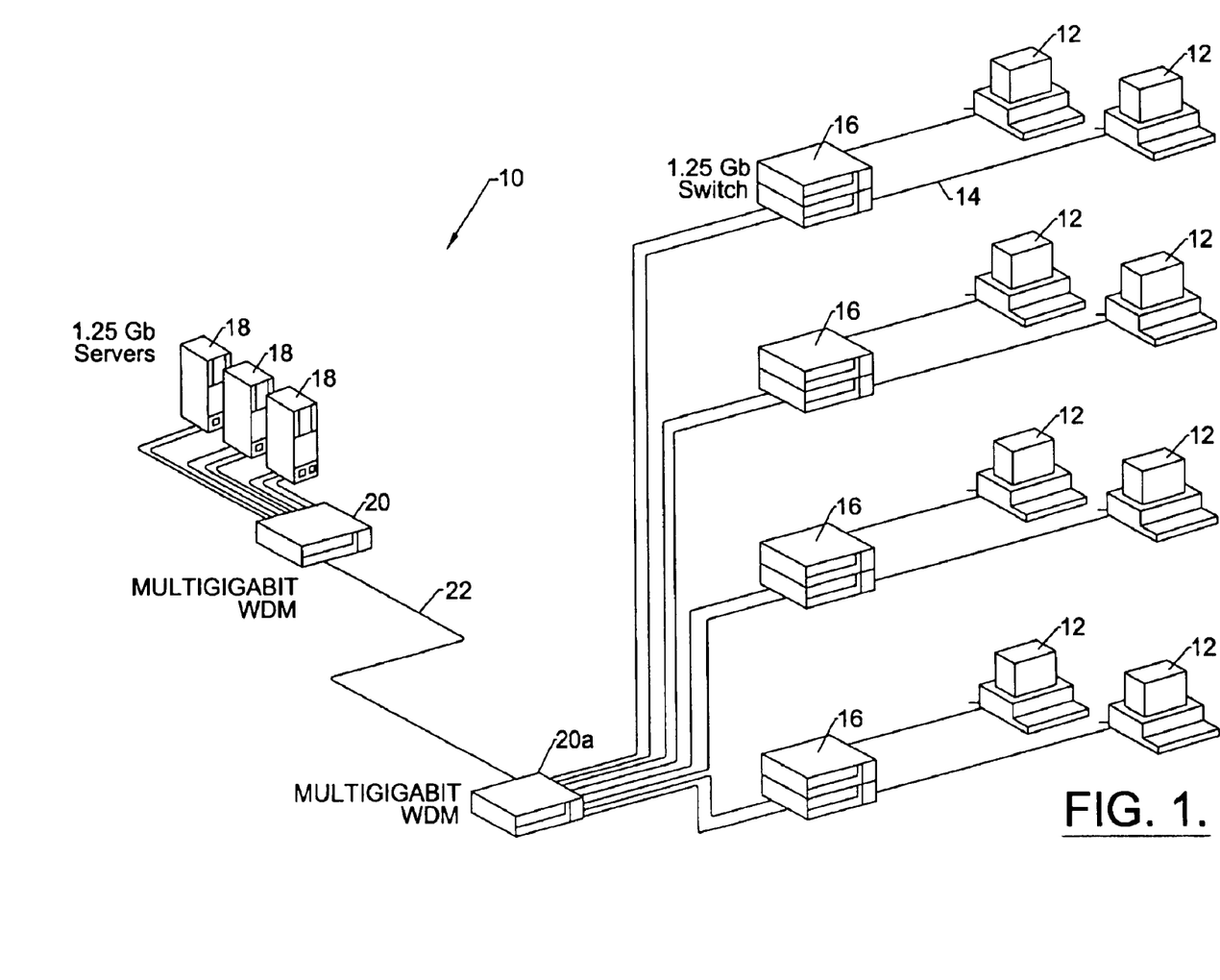
FIG. 1 illustrates an exemplary Ethernet infrastructure having a multimode WDM network transceiver of the present invention connected to Ethernet servers and respective Ethernet switches.

FIG. 1 illustrates a network 10 as an Ethernet infrastructure, having personal computers 12 connected via regular network wiring connections 14, known to those skilled in the art, to 1.25 Gb network, e.g., Ethernet, switches 16. The Ethernet infrastructure 10 includes servers as illustrated at 18, where three 1.25 Gb servers are shown. The servers 18 are operatively connected to the multimode WDM network transceiver 20 of the present invention and operatively connected to existing multimode optical fiber 22 and a second multimode WDM network transceiver 20a, which is operatively connected to the 1.25 Gb network, e.g., Ethernet, switches 16. Although the term "multimode WDM network transceiver 20" is used throughout the description, it should be understood that in the context of the Ethernet infrastructure 10 of FIG. 1, the transceiver is an exemplary multimode wavelength division multiplexed Ethernet transceiver that is operative from about 1.25–20 Gb/s. It can be used for various products as further explained below, including but not limited to, an Ethernet transceiver, an Ethernet converter and multiport Ethernet hub.

Figure 1A:
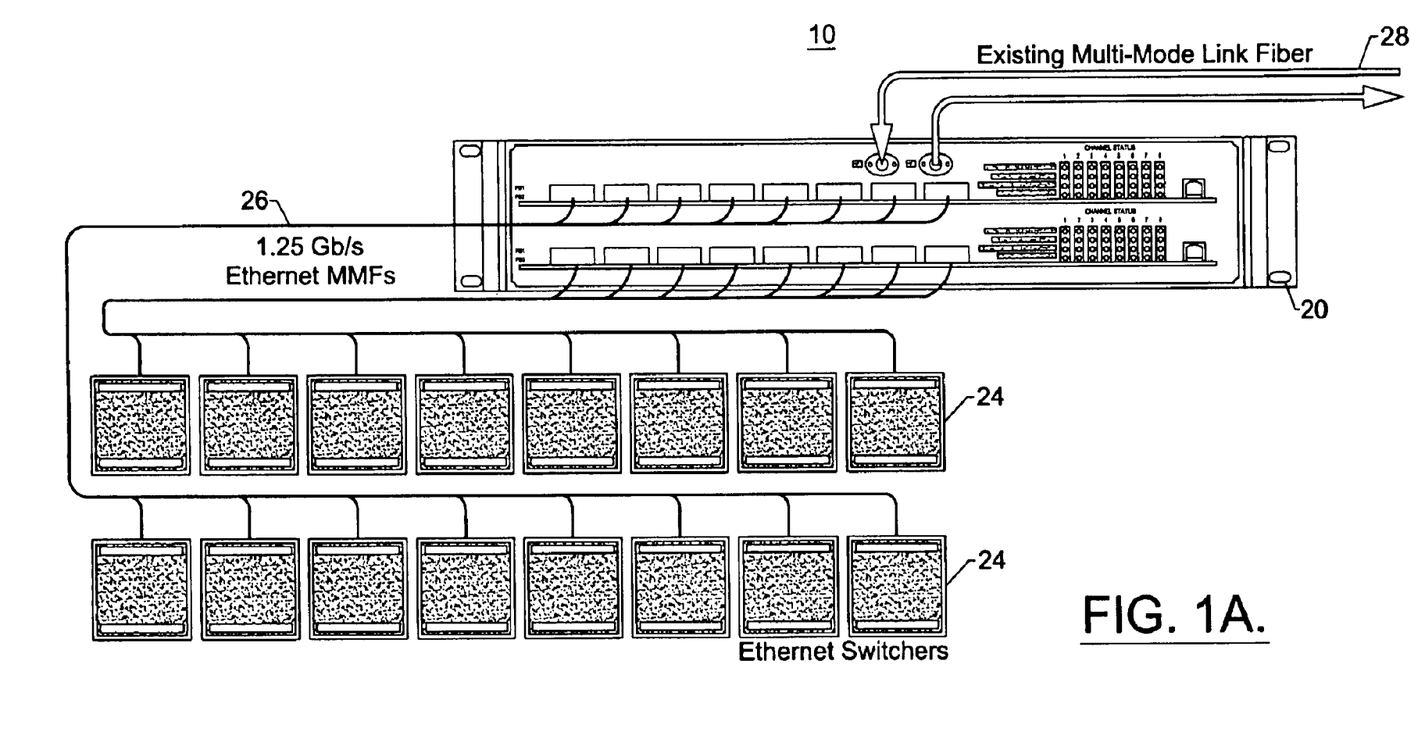
FIG. 1A illustrates a plurality of Ethernet switchers connected via multimode optical fiber to the multimode WDM network transceiver of the present invention as used in an Ethernet infrastructure.

FIG. 1A is a block diagram showing another example of the multimode WDM network transceiver 20 that operatively connected to 16 different Ethernet switches 24, via 1.25 Gb/s Ethernet multimode fiber 26 and to the existing optical multimode link fiber 28 for transmitting and receiving data signals. The transceiver 20, in one embodiment, is formed as a separate module that is operatively connected to existing Ethernet and other network components. It is operative with up to about 16 channels of 1.25 Gb/s, 200 GHz through 400 GHz spaced WDM optical communications signals. The system is operative with short haul local area network on 62.5 micrometers or 50 micrometer multimode fiber or single mode fiber. The multimode WDM network transceiver can be formed on one printed wiring circuit board (or other chassis or other known type of circuit board), and inserted into a conventional 19" or similar rack. The transceiver can be rack mounted in a 5U ventilated chassis or slice apparatus, as known to those skilled in the art. The transceiver 20 is operative at different wavelengths, and particularly the ITU grid of 1550.XXX nanometer wavelengths known to those skilled in the art. The transceiver 20 is Ethernet compatible and is also transparent to other time division multiplexing (TDM) formats, such as 100 base-FX and similar existing standards.

The present invention advantageously allows 2–16 channels of Gb Ethernet to be combined into a single multimode fiber, allowing up to 20 Gb/s data throughput on an existing LAN structure. In one aspect of the present invention, it is scalable to 16 channels and uses a multiplexer with a standard commercial off-the-shelf (COTS) 1×16 coupler, and a demultiplexer filter based on a bulk detraction grating and 50 or 62.5 micrometer multimode fiber. It advantageously reuses the existing multimode link fiber and compatible with existing standards and reuses existing equipment. It has a greater reach with a direct interface to existing equipment and "as needed" modular channel upgrades.

The transceiver 20 of the present invention uses transmitters, such as 2.5 Gb/s directly modulated distributed feedback (DFB) laser modules with integrated thermoelectric cooler (TEC), temperature control, optical power control and laser driver circuitry. The receivers can use 2.5 Gb/s, InGaAS PIN diodes with integrated transimpedance amplifier (TIA), post amplifier, positive emitter coupled logic (PECL) driver and signal detect. The transceiver, in one aspect of the present invention, has an interface to existing 1.25 Gb Ethernet backbone with 850 nanometer transceivers and ST couplers for multimode fiber connection.

Although not illustrated in detail, the transceiver 20 could be incorporated in a separate housing, such as a module box, with front panel light emitting diode (LED) indicators used for each channel, such as an 850 nanometer signal detect (green), a WDM signal detect (green), a WDM launch power (red), and WDM wavelength error (red). The power supply could be a 200 watt supply with 3.3 volt, 5 volt and 12 volt outputs with thermoelectric coolers at 3.3 volts and 11 amps. The receivers and transceivers could be operative at 3.3 volts and 1.5 amps with laser control circuits at 5 volts and 0.2 amps and ventilation fans with 12 volts and 0.4 amp operation. Although the above specifications are only non-limiting examples, they give a detailed example of the type of components, circuits, and specifications operative with the present invention.

Figure 2:
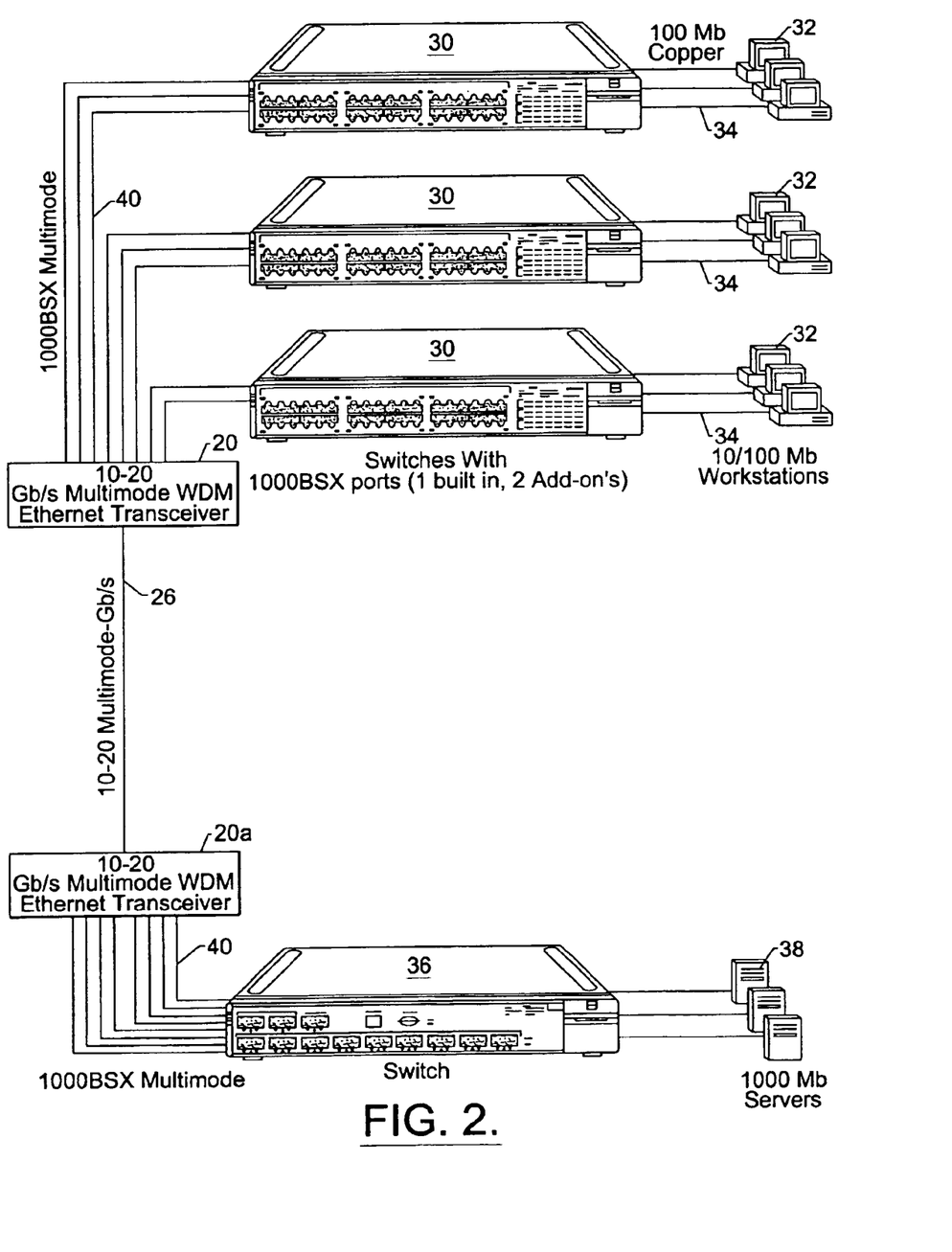
FIG. 2 is a schematic drawing of an exemplary Ethernet infrastructure and showing a use of the multimode WDM network transceiver of the present invention.

FIG. 2 illustrates an example of how the transceiver 20 is operative with Ethernet switches 30 having 1,000 BSX ports with one built in and two add-ons that are operatively connected to 10/100 megabyte workstations 32 via 100 megabyte copper interconnects 34, as part of an Ethernet infrastructure. Another Ethernet switch 36 is connected to 1000 Mb servers 38 and a second transceiver 20a via 1000 BSX multimode fiber 40.

Figure 3A:
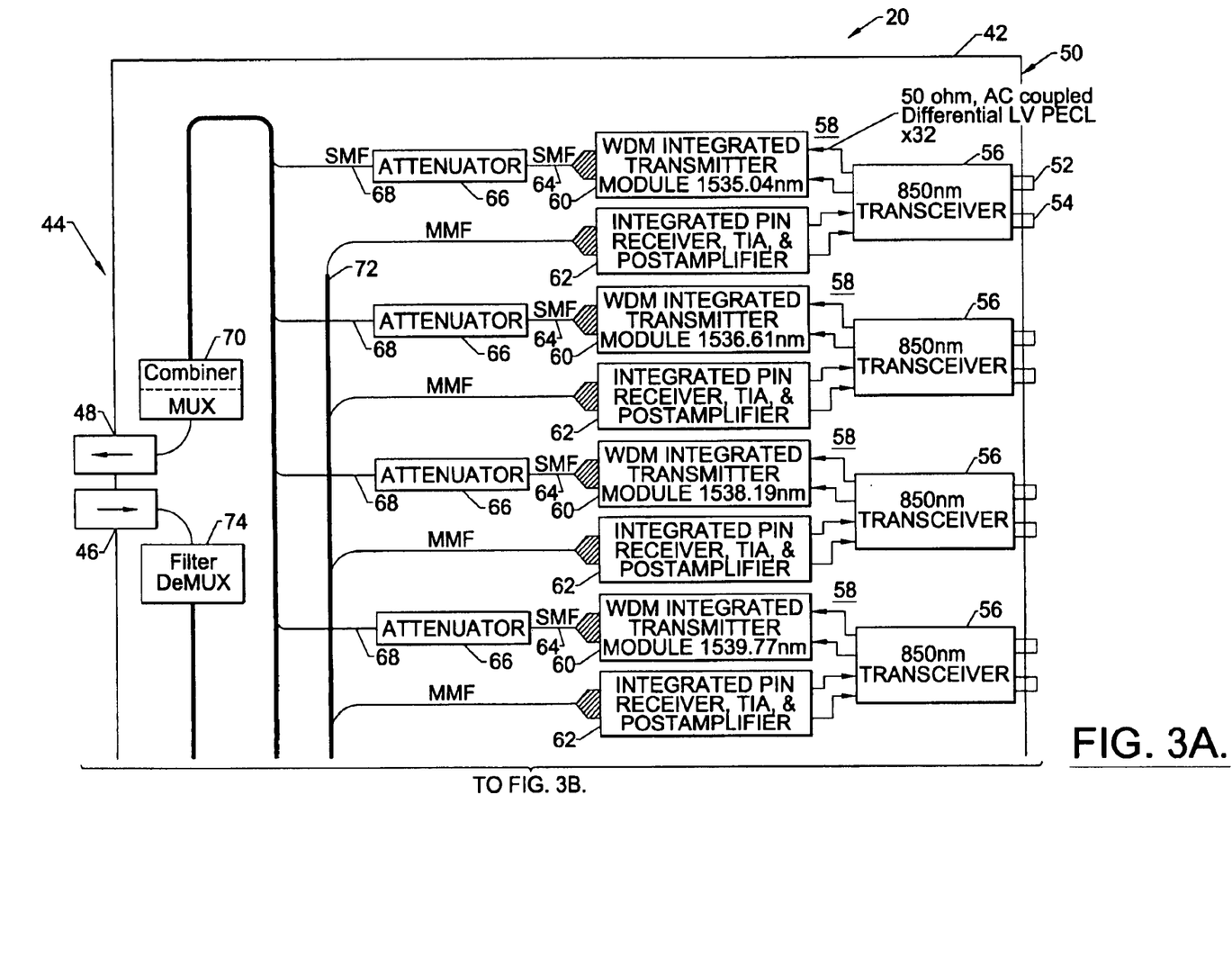
FIG. 3 is a high level block diagram showing basic components of an example of a multimode WDM network transceiver of the present invention.
Figure 3B:
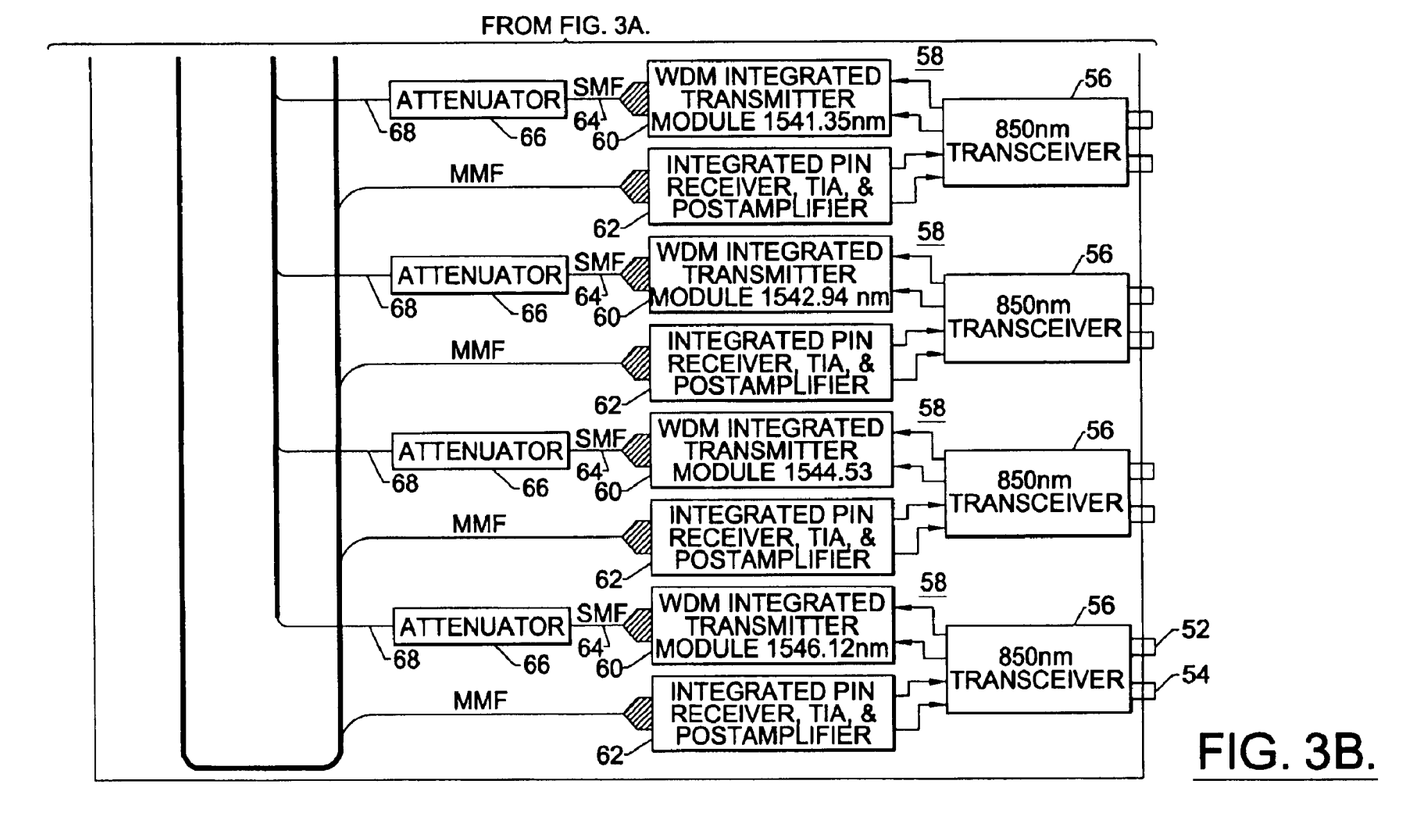

FIG. 3 illustrates a multimode WDM network transceiver 20 that can be incorporated onto one circuit board 42 and operative at 10 Gb/s. The transceiver 20 can be operative up to 20 Gb/s or more when additional components are added. The board 42 is only shown with sufficient components to allow 10 Gb/s data throughputs, as a non-limiting example.

The rear interface 44 to the existing link fiber is positioned at the rear of the board or module box and connects to the multimode fiber via a receive port 46 and transmit port 48, as illustrated. A front interface 50 to existing equipment allows fiber to be brought in and out as a plug-in to the front of the board or module box. The front interface 50 is compatible to existing equipment, as known to those skilled in the art, such as standard Ethernet equipment. The front interface 50 includes the transmit and receive fiber connectors 52,54 (or ports) that interconnect existing optical fiber into 850 nanometer transceivers 56, as a non-limiting example. Eight 850 nanometer transceivers 56 are illustrated to allow 10 Gb/s multimode WDM network data transfer as one example of the present invention. In a 20 Gb/s multimode WDM network transceiver board 42, as an example, sixteen 850 nanometer transceivers would be used and would connect as a direct interface to existing equipment.

The transceivers 56 are connected via a 50 ohm, AC coupled differential, LV positive emitter coupled logic (PECL) connection 58 to a WDM integrated optical transmitter module 60, operative in the 1500.XX nanometer wavelength band. A receiver 62 is preferably formed as an integrated PIN receiver, including InGaAS PIN diodes. It includes a transimpedance amplifier (TIA) and postamplifier operative therewith. The WDM integrated transmitter module 60 is connected via single mode fiber 64 to an attenuator 66, which in turn, is connected with single mode fiber 68 and operative with a combiner/multiplexer 70, which multiplexes the optical communications signals from the single mode fiber to transmit over one multimode fiber at the transmit port 48. The integrated PIN receiver 62 is connected to multimode fiber 72, which is connected to a filter 74 that is an 8 or 16 channel demultiplexer (8 channel illustrated), which filters out the different wavelengths received on the existing link fiber into the separate wavelengths by techniques known to those skilled in the art.

Figure 4:
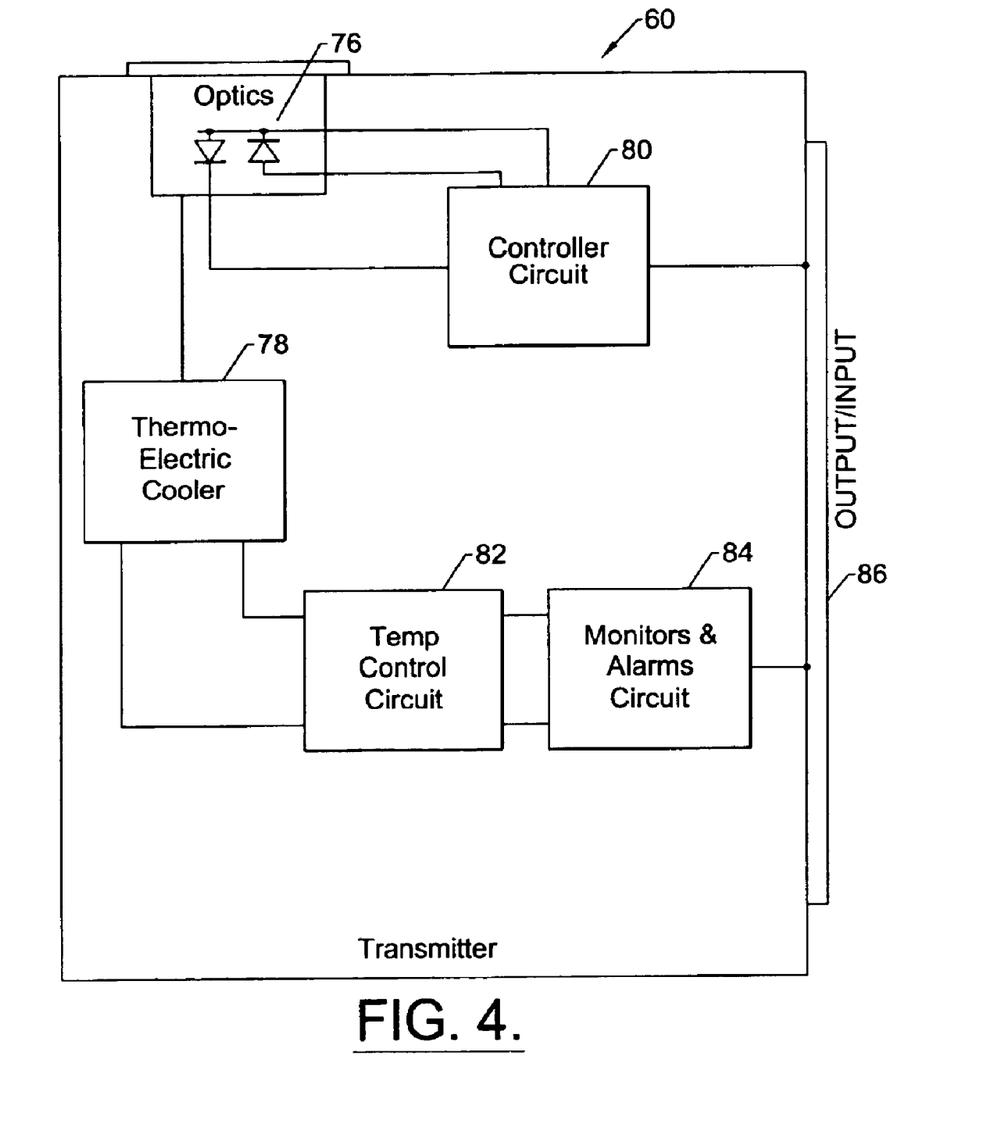
FIG. 4 is a high level block diagram of a transmitter module that can be used in the multimode WDM network transceiver of the present invention.

FIG. 4 illustrates a block diagram of a WDM integrated transmitter module 60 that can be used in the present invention and is operative at the wavelengths, such as illustrated in FIG. 3. The optical transmitter 60 includes standard optics, using diodes 76, thermoelectric cooler (TEC) 78, a controller circuit 80 that acts as a laser driver and control circuit, and an appropriate temperature control circuit 82 and monitor and alarm circuit 84. Various output/input ports 86 are used for operation and interconnection. The transmitter 60 can be formed as a distributed feedback laser circuit.

The optical transmitter 60 can be operative on a single silicon integrated circuit with a back facet diode as a feedback element with a closed loop control system. Such types of devices are manufactured and sold by various companies, including Nortel Networks Corporation as a 2.488 Gb/s WDM transmitter module. The optical transmitter can include inputs that are AC coupled with 100 ohm differential impedance and a voltage swing for PECL/CL. The laser device can be a distributed feedback laser with optical isolation, laser drive, automatic laser power control and monitoring function with the thermoelectric cooler, to maintain constant laser temperature and wavelength. The transmitter can include standard microprocessor based control circuits having an optical output via a single mode pigtail that can be fitted with various single mode optical connectors, as known to those skilled in the art.

The various output/input ports 86 and associated circuit functions include a transmitter disable for enabling and disabling the laser and a laser bias current monitor that provides an analog voltage output for laser bias current, indicating a change of laser threshold as the laser ages. A bias out-of-limits alarm can be activated when there is a failure of the laser or when the laser EOL characteristics are about to be met. Temperature monitoring provides a voltage output for a laser submount temperature and a temperature alarm can provide an appropriate alarm with threshold. The modulation input allows amplitude modulation for wavelength tagging while appropriate power supply inputs can be filtered.

Figure 5:
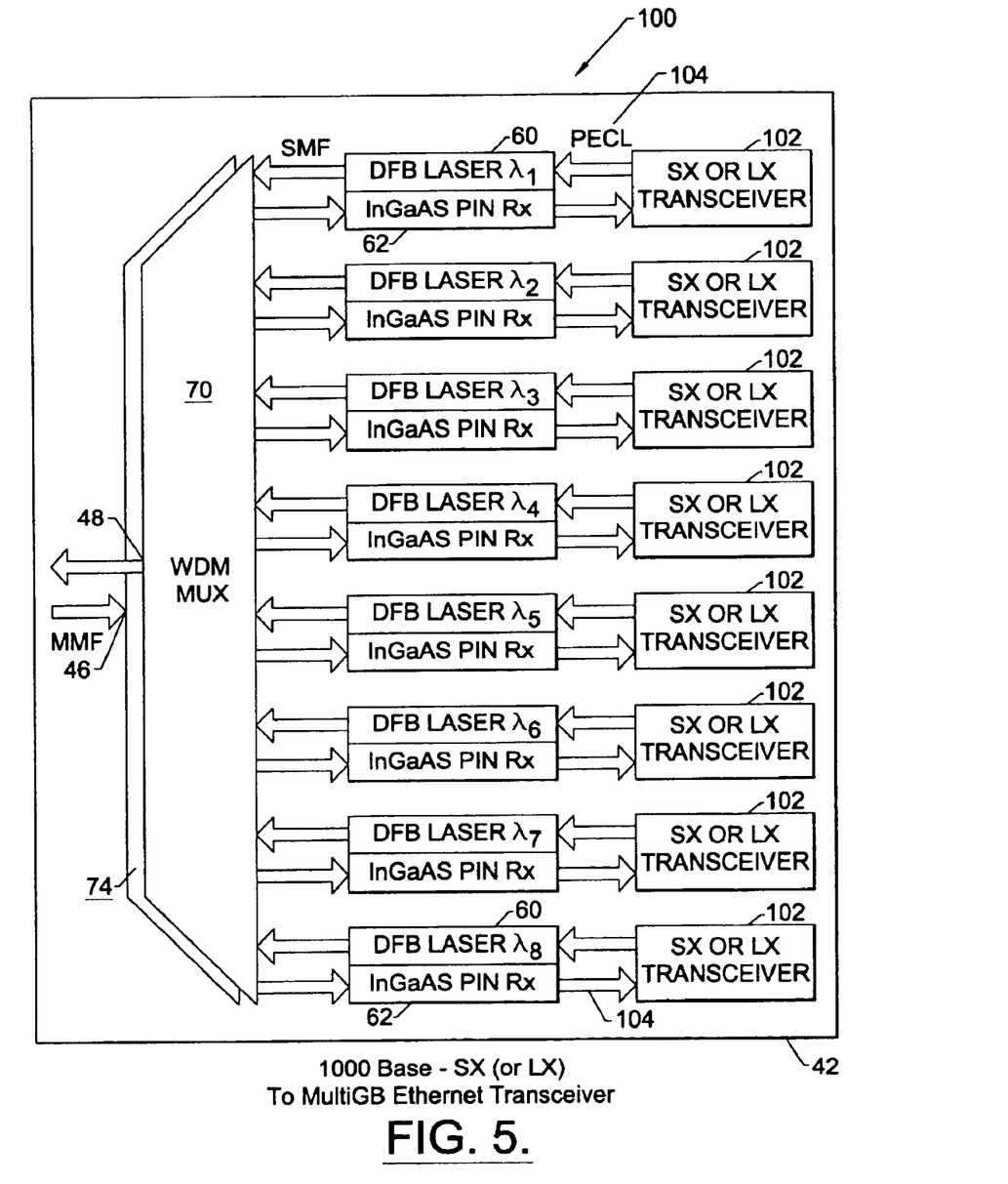
FIG. 5 is a high level block diagram of another example of a multimode WDM network transceiver of the present invention, which allows multiple channels to be combined into a single multimode fiber allowing increased data throughput on an existing local area network (LAN) architecture.

FIGS. 5–8 illustrate three different embodiments of the present invention. FIG. 5 illustrates a 1,000 Base-SX (or LX) to 10 Gb/s (or 20 Gb/s) Ethernet transceiver 100, where short wavelength laser transceivers or multimedia fiber support lengths of 300 meters (using 62.5 micrometer multimode fiber) or 550 meters (using 50 micrometer multimode fiber) can be operable. 1,000 Base-LX long wavelength laser transceivers can also be used for transmission facilities. An SX or LX transceiver 102 is connected via positive emitter coupled logic (PECL) circuit 104 to the transmitter module 60 having distributed feedback laser and operative at a first wavelength and to the InGaAS PIN receiver 62. Eight receivers and transmitters are illustrated, and operative at eight wavelengths λ1 to λ8, which are operative on eight signal channels. The eight wavelength signal channels and associated transmitters and receivers are connected to the WDM multiplexer 70 and filter 74 as described before with optical fiber connections for transmit and receive ports. This example of the present invention allows eight (or 16 if 16 transceivers are used) channels of SX or LX Gb Ethernet to be combined into a single, duplex, multimode fiber allowing 10 (or 20) Gb/s data throughput on the existing local area network (LAN) architecture.

Figure 6:
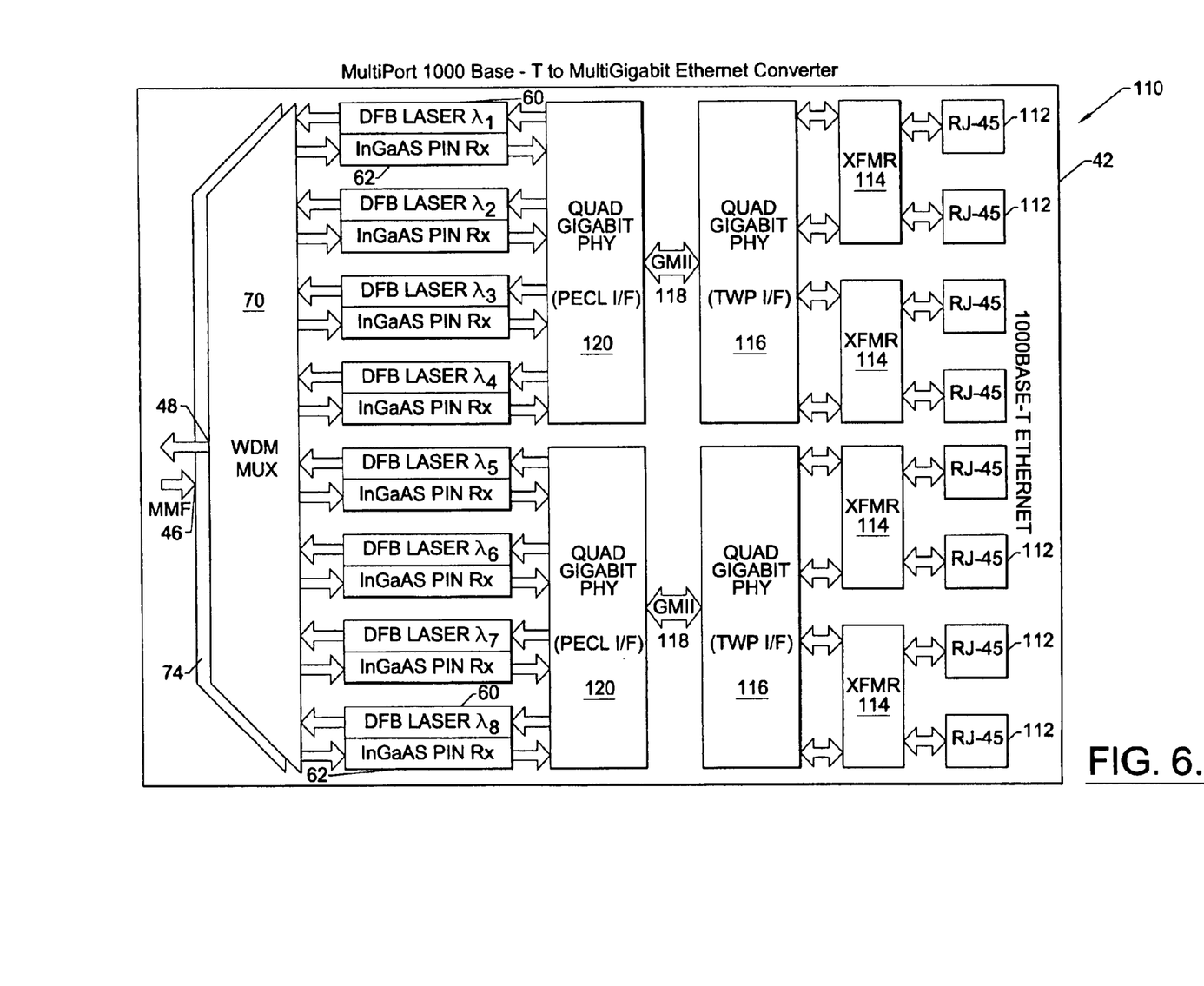
FIG. 6 is a block diagram of another example of a multimode WDM network transceiver as an exemplary Ethernet converter, which allows a multiport 1,000 base-T connection and conversion to a gigabyte WDM signal.

FIG. 6 illustrates another embodiment of the present invention using similar components, but showing an eight port 1,000 Base-T to 10 Gb/s Ethernet converter 110, which could be a 16 port 1,000 Base-T to 20 Gb/s Ethernet converter when 16 electrical input channels and appropriate components are used. As illustrated, the 1,000 Base-T Ethernet connection is used with RJ-45 couplers 112 that are connected to transformers (XFMR) 114 using circuit principles known to those skilled in the art. The transformers 114 are operative with quad gigabyte physical sublayer chips 116 (PHY) and a gigabyte medium independent interface (GMII) circuit 118 to the quad gigabyte physical sublayer chips (PHY) (PECL I/F) 120, as known to those skilled in the art. The GMII interface 118 could define independent parallel transmit and receive synchronous data interfaces and allows a chip-to-chip interface to mixed Media Access Control (MAC) and physical sublayer components. The GMII interface 118 is operative with the pairs of quad Gb physical sublayer components 116, 120, as illustrated. The positive emitter coupled logic (PECL) quad gigabyte PHY 120 is operative with the transmitters 60, having the DFB laser modules, and operative with the InGaAS PIN receivers 62, the filter/demultiplexer and multiplexer.

Figure 7:
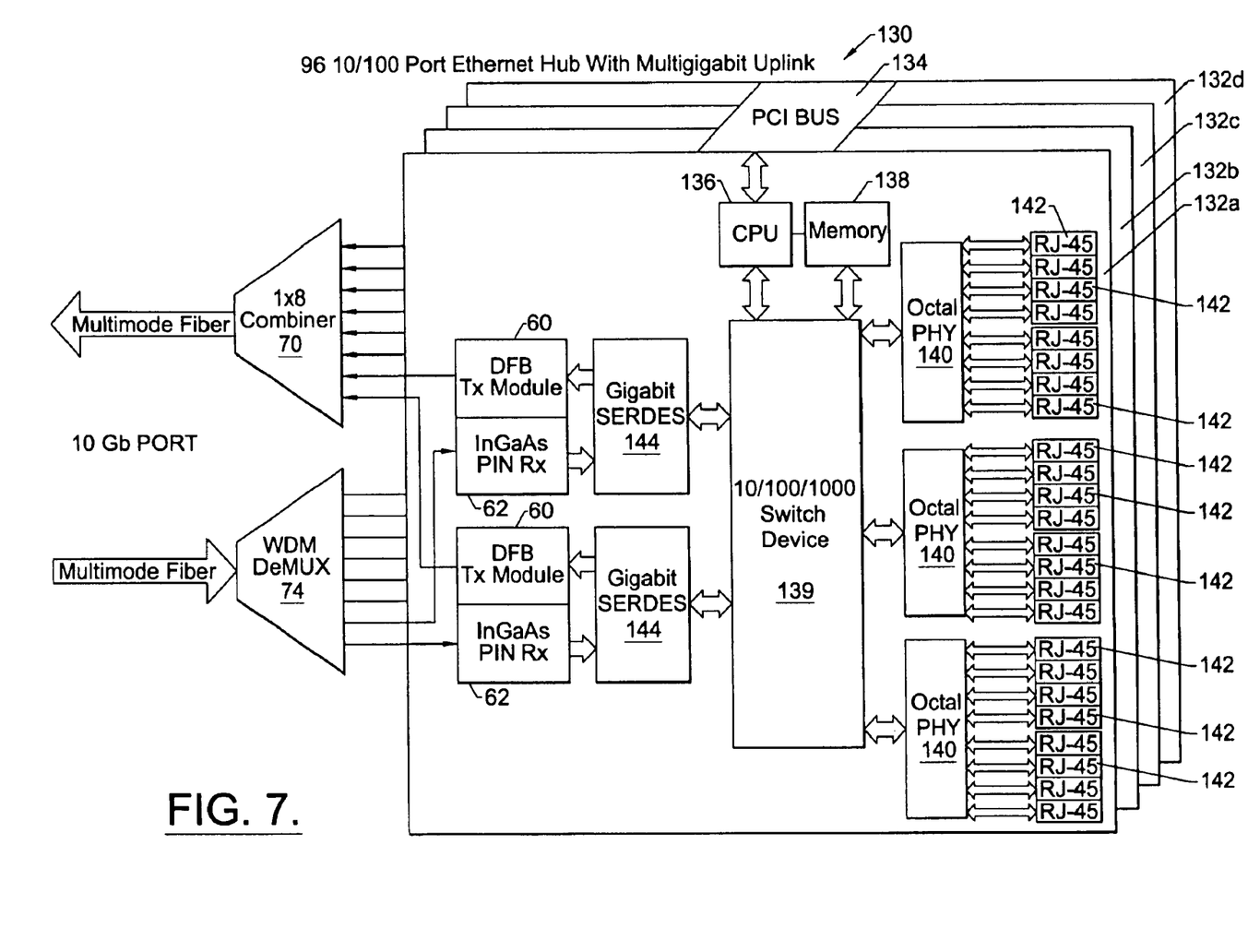
FIG. 7 is a block diagram of another example of a multimode WDM network transceiver of the present invention and showing an exemplary Ethernet hub that implements direct conversion from 10/100 copper to gigabyte wavelength division multiplexed signals.
Figure 8:
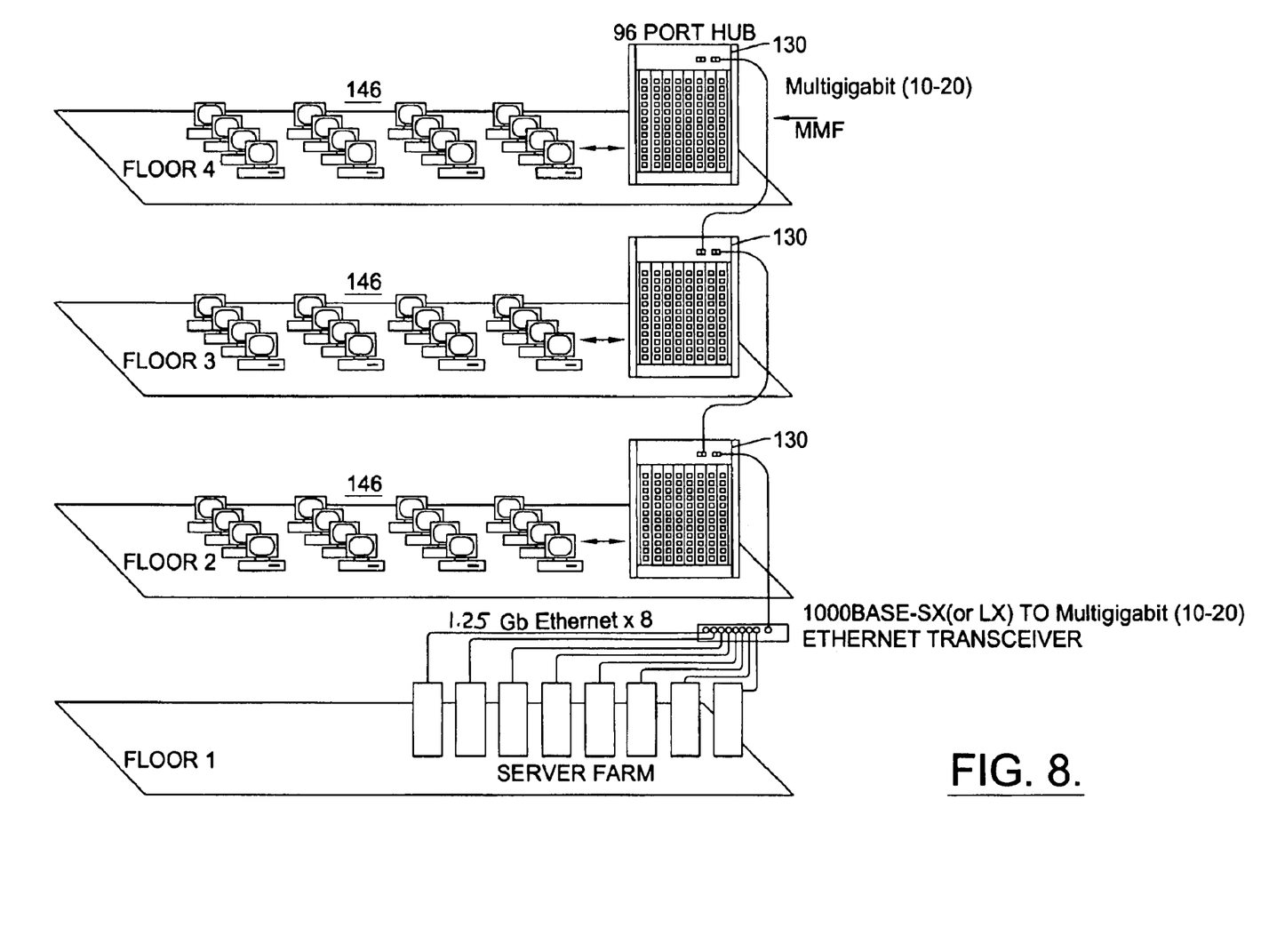
FIG. 8 is a block diagram of the Ethernet hub of FIG. 7, showing a network application on various floors of a building.

FIGS. 7 and 8 illustrate another embodiment of the present invention forming a 96 10/100 port Ethernet hub 130 having a 10 Gb/s uplink. As illustrated, four separate transceiver boards 132a–d are connected via a PCI bus 134, and operable with a CPU 136 and memory unit 138 into a 10/100/1000 switch device 139. The switch device is operative with the octal physical sublayer chips (PHY) 140 and RJ-45 input ports 142. The switch device 139 is operative with gigabyte serializer/deserializer (SERDES) 144 and is typically monolithically formed with clock recovery and clock multiplication with multiple interfaces, back plane, cables and optical modules. As known to those skilled in the art, the SERDES 144 is also typically formed as an application specific integrated circuit (ASIC) transceiver core that provides for integrated, ultra-high speed bidirectional point-to-point data transmission over various impedance media. The SERDES connects through the DFB transmitter 60 and PIN receiver 62 of the type as described before, and into the appropriate combiner/multiplexer and demultiplexer/filter using the multimode fiber at transmit and receive ports to form the 10 Gb/s port as illustrated. Thus, the hub allows direct conversion from 10/100 copper to 10 Gb/s WDM optical link.

FIG. 8 shows a network application with the 1,000 base-SX (4 LX) to multi-gigabyte (10–20) Ethernet transceiver of the present invention and showing on floor one a server farm with floor 2, floor 3 and floor 4 having various Ethernet hubs 130 of the present invention connected to various workstations 146 as illustrated.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A multimode wavelength division multiplexing (WDM) network transceiver system comprising:

a plurality of optical single channel transceivers each operative at a first wavelength band and receiving optical communications signals;

a plurality of optical transmitters operatively connected and matched to respective single channel transceivers and receiving signals electrically processed at each respective single channel transceiver at the first wavelength band and transmit optical communications signals along respective signal paths at a second wavelength band;

a wavelength division multiplexer operatively connected to each optical transmitter for receiving the optical communications signals at the second wavelength band and wavelength division multiplexing the optical communications signals within the second wavelength band into a multimode wavelength division multiplexed optical communications signal having a wavelength channel spacing less than about 1,000 gigahertz;

a demultiplexer for receiving a multimode wavelength division multiplexed optical communications signal within the second wavelength band from another multimode wavelength division multiplexing (WDM) network transceiver system and demultiplexing the signal into a plurality of demultiplexed optical communications signals; and a plurality of optical receivers each connected to the demultiplexer and matched with a respective single channel transceiver for receiving and detecting the demultiplexed optical communications signal and passing to a respective single channel transceiver the optical communications signal at the first wavelength band, the network transceiver system further comprising a serial/deserializer (SERDES) circuit operatively connected to an optical transmitter and matched optical receiver, a switch circuit operatively connected to said serial/deserializer circuit, and a physical sublayer chip circuit and electrical interface operatively connected to said switch circuit.

2. A network transceiver system according to claim 1, wherein each optical receiver comprises a PIN detector.

3. A network transceiver system according to claim 2, wherein said PIN detector comprises an InGaAS PIN detector.

4. A network transceiver system according to claim 2, wherein each optical receiver further comprises a transimpedance amplifier.

5. A network transceiver system according to claim 1, wherein each optical receiver comprises an Avalanche Photo Diode (APD).

6. A network transceiver system according to claim 5, wherein each optical receiver comprises an InGaAS APD detector.

7. A network transceiver system according to claim 1, wherein each optical transmitter comprises a distributed feedback laser.

8. A network transceiver system according to claim 7, wherein each optical transmitter comprises a thermoelectric cooler and controller circuit.

9. A network transceiver system according to claim 1, and further comprising an attenuator positioned within a transmit signal channel between each optical transmitter and said multiplexer.

10. A network transceiver system according to claim 9, and further comprising a single mode optical fiber defining a signal channel between said attenuator and said optical transmitter and an optical fiber defining signal channel between said attenuator and said multiplexer.

11. A network transceiver system according to claim 1, wherein said second wavelength band is upconverted from said first wavelength band.

12. A network transceiver system according to claim 1, and further comprising a physical sublayer chip circuit operatively connected to a plurality of optical transmitters and matched optical receivers.

13. A network transceiver system according to claim 12, and further comprising an electrical interface operatively connected to said physical sublayer chip circuit.

14. A network transceiver system according to claim 13, wherein said electrical interface comprises a plurality of RJ-45 jacks for Ethernet 1000 Base-T connection.

* * * * *